US007034713B2

(12) United States Patent
Yang et al.

(10) Patent No.: US 7,034,713 B2
(45) Date of Patent: Apr. 25, 2006

(54) AUTONOMOUS AND UNIVERSAL REMOTE CONTROL SCHEME

(76) Inventors: Yu-Chung Yang, No. 102, Kao Feng St., Ping Tung (TW); Fan-Tien Cheng, No. 42, Alley 7, Lane 275, Kai Nan St., Tainan (TW)

( * ) Notice: Subject to any disclaimer, the term of this patent is extended or adjusted under 35 U.S.C. 154(b) by 293 days.

(21) Appl. No.: 10/190,688

(22) Filed: Jul. 8, 2002

(65) Prior Publication Data

US 2004/0004552 A1 Jan. 8, 2004

(51) Int. Cl.
*H04Q 1/00* (2006.01)

(52) U.S. Cl. ............................ 340/825.69; 340/825.22

(58) Field of Classification Search ........... 340/825.22, 340/825.69, 825.72, 825.24, 825.25, 8; 341/176; 348/734

See application file for complete search history.

(56) References Cited

U.S. PATENT DOCUMENTS 5,410,326 A * 4/1995 Goldstein ............. 340/825.72
5,819,294 A * 10/1998 Chambers .................. 340/825
6,133,847 A * 10/2000 Yang ..................... 340/825.72
6,255,961 B1 * 7/2001 Van Ryzin et al. ..... 340/825.24

* cited by examiner

*Primary Examiner*—Brian Zimmerman
(74) *Attorney, Agent, or Firm*—Timothy J. Keefer; Seyfarth Shaw LLP

(57) ABSTRACT

An autonomous and universal remote control system and scheme is disclosed. The autonomous and universal remote control system comprises at least one generic embedded controller (GEC) respectively installed on at least one controlled target, such as appliances, robots and equipment, etc.; and a generic remote controller (GRC), wherein the at least one GEC matches with the GRC. The autonomous and universal remote control scheme utilizes the GRC to sense the type of the at least one controlled target automatically, and then to download the context of controlled target dynamically, thereby autonomously controlling the controlled targets of various types with one single GRC.

9 Claims, 2 Drawing Sheets

AUTONOMOUS AND UNIVERSAL REMOTE CONTROL SCHEME

FIELD OF THE INVENTION

The present invention relates to an autonomous and universal remote control system and a scheme thereof, and more particularly, to the autonomous and universal remote control system and the scheme thereof, which do not need to go through the steps of configuration and adjusting settings before use.

BACKGROUND OF THE INVENTION

With the development of information technology, the conventional appliances definitely will be further evolved with the modern technologies. Information appliances (IA) will be integrated in more powerful functions with the capability of networking and wireless communication at the prices competitive to those of the conventional appliances, and will enter each family with more friendly operating methods. Remote controllers have become an indispensable device for operating appliances. However, with the development of technology, the functions of information products have been enhancing and become more diversified, and thus the remote controllers accompanying with the information appliances also become more and more both in functions and quantities. Currently, the way adopted by the remote controllers on the markets is that each of the appliances, such as air-conditioners, televisions, DVD players and stereos, has its own remote controller. Hence, with the increasing varieties of appliance products, the number of remote controllers owned by each family is dramatically increased, and using so many remote controllers on hand at the same time has caused a lot of user's inconvenience.

Although there have been many so-called universal remote controllers (i.e. a remote controller having many kinds of physical buttons) presented on the market currently, yet before use, those universal remote controllers all have to be configured and adjusted in advance so as to comply with the channels of the appliances to be controlled. Due to the hardware or functional constraints of those so-called universal remote controllers, each universal remote controller usually can only control one or two types of controlled targets, such as the universal remote controller used for controlling a TV and a video recorder; and the universal remote controller for controlling a TV and a stereo.

Hence, there is an urgent need to develop an autonomous and universal remote control system and a scheme thereof, wherein the system and the scheme thereof do not need to be configured and adjusted before use, and thus will not be constrained by the number and types of controlled targets. Using one single remote controller of the present invention can automatically control at least one controlled target of various types, such as electronic products, robots, machines or instruments, etc. Moreover, the remote controller of the present invention can also automatically adjust and generate appropriate user interfaces in accordance with different controlled targets, whereby users can operate, remotely control and monitor each of the controlled targets.

SUMMARY OF THE INVENTION

In view of the aforementioned background, many remote controllers existing at the same time will cause a lot of operation inconvenience, and the so-called universal remote controllers have to go through the steps of configuration and adjusting settings before use, which are constrained by their hardware and functions, so that they are not able to automatically operate and control multiple controlled targets.

Hence, it is a main object of the present invention to provide an autonomous and universal remote control system and a scheme thereof, thereby automatically searching for controlled targets, and dynamically downloading the contexts from the controlled targets, so that merely using one single remote controller can operate and control the controlled targets of various types without the need of manual setting, and meanwhile is not constrained by the varieties and number of controlled targets.

It is the other object of the present invention to provide an autonomous and universal remote control system and a scheme thereof, thereby automatically adjusting and generating appropriate user interfaces for users' convenience of operation.

According to the aforementioned objects, the present invention discloses an autonomous and universal remote control system and scheme. The autonomous and universal remote control system comprises: at least one generic embedded controller (GEC) respectively installed on at least one controlled target; and a generic remote controller (GRC), wherein each controlled target has a processor installed thereon, each GEC comprising: a GEC UID (Unified Identification) transmission interface; a GEC data transmission interface; a UID generating means; a context generating means; and a GEC distributed computing means, wherein the UID generating means, the context generating means and the GEC computing means belong to the GEC kernel. The GRC further comprises: a UID recognition means; a context collection means; a context translation means; a GRC distributed computing means; a GRC UID transmission interface; a GRC data transmission interface; and a user interface, such as touch screen, etc., wherein the UID recognition means, the context collection means, the context translation means and the GRC distributed computing means belong to the GRC kernel.

On the other hand, an autonomous and universal remote control scheme comprises: GEC publishing a UID, and performing a UID transmission to transmit the UID; GRC obtaining and recognizing the UID; triggering the context collection means; sending a context-requesting instruction; sending the context-requesting instruction via the GRC distributed computing elements; performing the data transmission to transmit the context-requesting instruction; sending the context-requesting instruction to the GEC distributed computing means; sending the context-requesting instruction via the GEC distributed computing means to the context generating means for generating a context; sending the context to the GEC data transmission interface; performing the data transmission to transmit the context to the GRC data transmission interface; sending the context to the context collection means; sending the context to the context translation means; displaying information; generating and sending a command; sending the command via the GRC distributed computing means; performing the data transmission to transmit the command; sending the command to the GEC distributed computing means; sending the command via the GEC distributed computing means to the processor for execution, wherein the processor returns a response message thereafter; sending the response message to the GEC data transmission interface via the GEC distributed computing means; performing the data transmission to transmit the response message back to the GRC data transmission interface; sending the response message to the GRC distributed computing means; and displaying the response message.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention discloses an autonomous and universal remote control system and a scheme thereof. The present invention senses the type of at least one controlled target via UID transmission device, and then automatically downloads the context of the controlled target, and thereafter, switches to different touch screen interface in accordance with different controlled target. Hence, only one GRC having the autonomous and universal remote control scheme together with at least one GEC installed on the at least one controlled target are needed for controlling various controlled targets, such as electronic appliances, robots, equipments or instruments, etc.

The autonomous and universal remote control system comprises: a GRC; and at least one GEC respectively installed on at least one controlled target, wherein the at least one GEC matches with the GRC.

Figure 1:
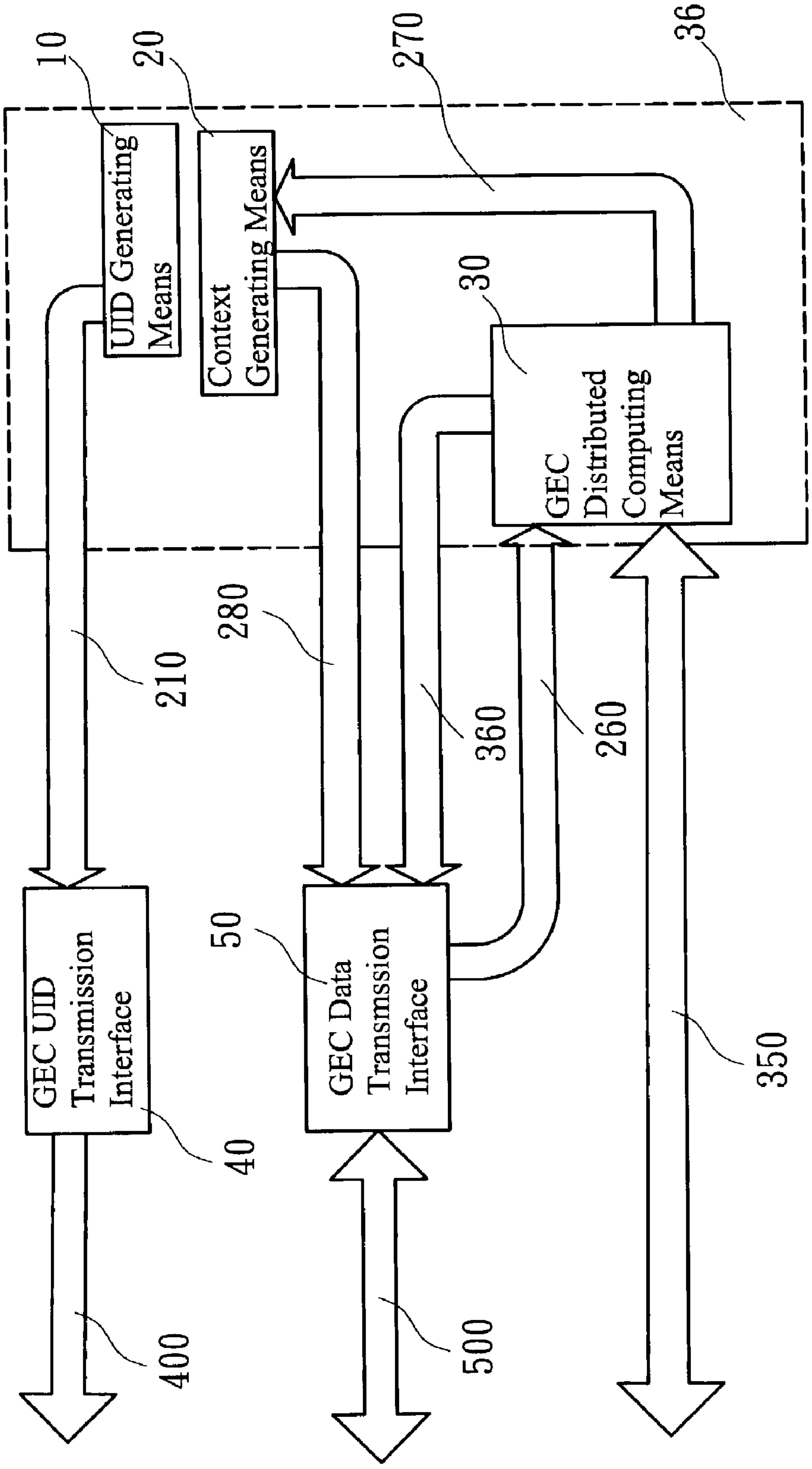
FIG. 1 is a diagram showing the functional blocks and their relationships for the GEC of the present invention.

Referring to FIG. 1, FIG. 1 is a diagram showing the functional blocks and their relationships for the GEC of the present invention. The controlled target has a processor (not shown) installed thereof for executing commands of operation and control, and also for communicating with the GEC and returning a response message, wherein the processor can be a digital signal processor (DSP) or a microprocessor, etc.

The GEC comprises: a GEC UID transmission interface 40; a GEC data transmission interface 50; a UID generating means 10; a context generating means 20; and a GEC distributed computing means 30, wherein the UID generating means 10, the context generating means 20 and the GEC distributed computing means 30 all belong to an embedded operating system 36, and can be designed as a GEC kernel together with the GEC UID transmission interface 40 and the GEC data transmission interface 50, and can further be fabricated as a SIP (Silicon Intellectual Property) or a SOC (System On Chip) so as to be conveniently installed on the controlled target. Moreover, the SOC can also be fabricated as a device similar to the Set-Top box or a system chip having more powerful functions, so as to be installed on the controlled target.

As to the definition of UID, the present invention may adopt a routine form to describe the pattern of the UID, or apply some encoding methods to generate the UID. For example, the UID can be composed of the controlled target's ID and network address. As to a context, the context is a descriptive method defined by the present invention for controlling the interface between GEC and GRC, wherein the context records the related data of GEC and GRC, and also the control interface and method corresponding to the GEC. Besides, the context also can include the method of encoding and compressing data, and a digital signature. The context can be coded in any kinds of languages which can describe the control interface of GEC, such as XML, C, Java or other object codes, etc. Moreover, the distributed computing scheme (such as the distributed Remote Procedure Call therein) and a wireless network need to be used for enabling the interoperability between the GRC and the GEC (i.e. the controlled target).

Generally speaking, each GEC has the following states: 1. Once the GEC is activated, the GEC will automatically publish its UID periodically, and each GEC distributed computing means 30 will enter the state of standby; 2. When receiving the context-requesting instruction issued from the GRC, the GEC will publish the context; 3. When receiving commands from the GRC, the GEC will pass the commands to the DSP or mircoprocessor of the controlled target for execution so as to perform the control action, and then to return a response message to the GRC.

Figure 2:
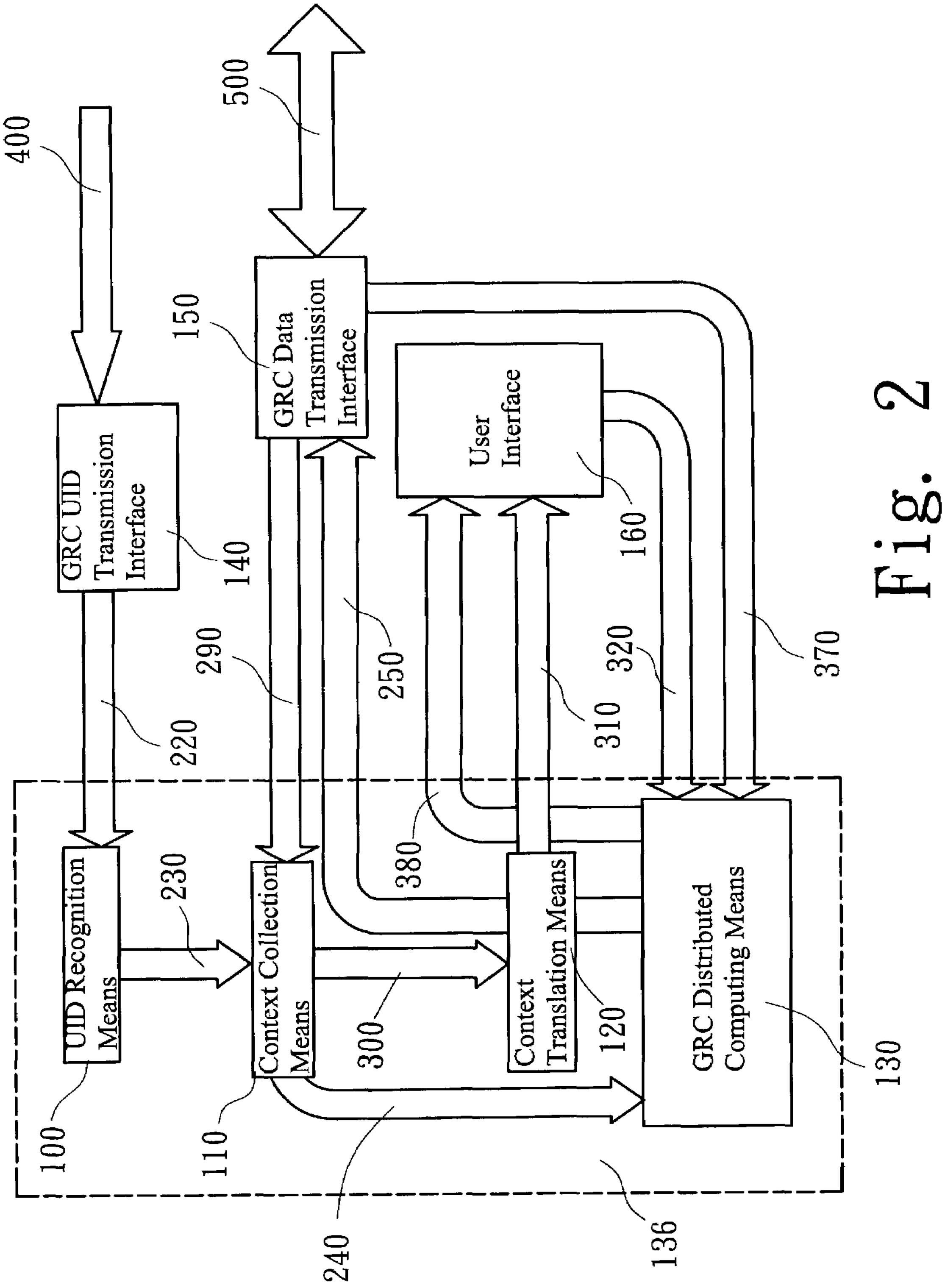
FIG. 2 is a diagram showing the functional blocks and their relationships for the GRC of the present invention.

Referring to FIG. 2, FIG. 2 is a diagram showing the functional blocks and their relationships for the GRC of the present invention. The GRC comprises: a UID recognition means 100; a context collection means 110; a context translation means 120; a GRC distributed computing means 130; a GRC UID transmission interface 140; a GRC data transmission interface 150; and a user interface 160, such as a touch screen, etc., wherein the a UID recognition means 100, the context collection means 110, the context translation means 120 and the GRC distributed computing means 130 belong to the GRC kernel, and can be designed on the same embedded operating system 136, which can also be fabricated as a SOC. Except the user interface 160, the GRC UID transmission interface 140 and the GRC data transmission interface 150 also can be fabricated on the SOC or panel on which the embedded operating system 136 is made.

The UID recognition means 100 must be able to identify the UID, and to convert it into a useful information, for example, to identify the controlled target's ID and network address from the UID provided. Further, the UID recognition means 100 has to be equipped with the function for recognizing multiple sets of UID at the same time. The present invention may adopt the following method or other methods that can achieve the same function for resolving the aforementioned issues. First, define a time t seconds required for sending a byte. If K sets of UID are received at the same time, and each UID is ended with the symbol \n, and the UID recognition means 100 performs the function of recognition within T seconds, then when $$\sum_{i=1} (|UID_i| + 2) \cdot t \leq T$$

(wherein the reason for adding 2 is that \n occupies the length of 2 bytes.), all the K sets of UID can be identified; or in T seconds, only the UIDs appearing before the last recognized \n can be identified. Thereafter, users can select the controlled target to be controlled and operated from the UIDs that have been recognized.

After the step of UID recognition is completed, the context collection means 110 starts sending a request to the GEC via the GRC distributed computing means 130 and the GRC data transmission interface 150 for asking the context of the UID selected. After the context is obtained and downloaded into a temporary file, the context translation means 120 starts interpreting the context. The context translation means 120 mainly has an interpreting function coded by a complier technology for transforming the context into a screen that can be displayed on the user interface 160. Moreover, users also can issue a command via the user interface 160, and the command then will be passed to the GEC via the GRC distributed computing means 130.

As soon as the GRC is activated, it starts taking the UID signals sent by various GECs. After the step of recognizing UID signals is completed, the context of UID selected is obtained via the GRC distributed computing means 130, and then the context is interpreted and transformed into a GUI (Graphic User Interface) screen of the user interface 160 (such as touch screen). When users operate the touch screen, the command issued is sent to the GEC via the GRC distributed computing means 130. Thereafter, if the GEC returns a response message, the response message is displayed on the GUI screen.

Moreover, the GEC UID transmission interface 40 and the GRC UID transmission interface 140 can use the interfaces of UID transmission devices, such as an IrDa (Infrared Data Association) device (such as IrLan, VFIR or SIR, etc.), Bluetooth device, wireless network card (such as IEEE802.11b or IEEE802.11a, etc.), HomeRF, sensing coils or any other sensing devices, etc. The GEC data transmission interface 50 and the GRC data transmission interface 150 can use the data transmission devices, such as Bluetooth device or wireless network card, etc. The GEC UID transmission interface 40, the GRC UID transmission interface 140, the GEC data transmission interface 50 and the GRC data transmission interface 150 can all belong to the same transmission device, such as a Bluetooth device or a wireless network card, etc., i.e. the GEC UID transmission interface 40 and the GEC data transmission interface 50 both can be the same one interface, which is one interface of the transmission device; and the GRC UID transmission interface 140 and the GRC data transmission interface 150 both can be the same other one interface, which is the other interface of the transmission device. The aforementioned varieties and specifications of transmission interfaces are merely stated as examples, and the present invention is not limited thereto.

Continuously referring to FIG. 1 and FIG. 2, the flow process of the autonomous and universal remote control scheme of the present invention will be explained as follows.

At first, a UID is published (step 210) by the GEC, and is transmitted via UID transmission (step 400), wherein the UID is generated by the UID generating means 10, and the UID transmission is performed by the GEC UID transmission interface 40 and the GRC UID transmission interface 140. Thereafter, the GRC obtains the UID via the UID transmission (step 400), and recognizes the UID (step 220), wherein the UID is recognized and identified by the UID recognition means 100. Then, the GRC triggers the context collection means 110 (step 230), and the context collection means 110 sends a context-requesting instruction to the GRC distributed computing means 130 (step 240). Thereafter, step 250 is performed to send the context-requesting instruction to the GRC data transmission interface 150, and then data transmission is performed (step 500) for transmitting the context-requesting instruction to the GEC data transmission interface 50 from the GRC data transmission interface 150. After the GEC data transmission interface 50 obtains the context-requesting instruction, step 260 is performed to send the context-requesting instruction to the GEC distributed computing elements 30. Then the context-requesting instruction is sent to the context generating means 20 (step 270) via the GEC distributed computing means 30 (step 270). After a context is generated by the context generating means 20, the context is sent to the GEC data transmission interface 50 (step 280), and then the data transmission is performed (step 500) for transmitting the context from the GEC data transmission interface 50 to the GRC data transmission interface 150. After the GRC data transmission interface 150 obtains the context, the context is sent to the context collection means 110 (step 290). Thereafter, the context collection means 110 sends the context to the context translation means 120 (step 300) for interpreting and transforming the context into displayable information. Then, the step 310 of displaying information is performed for displaying the displayable information on the user interface 160.

After the UID is recognized and the context is displayed, users may issue a command via the user interface 160, and then send the command to the GRC distributed computing means 130 (step 320) for passing the command with the GRC distributed computing mechanism, wherein the users may further select the screens suitable for the controlled target. Then, step 250 is performed to send the command to the GRC data transmission interface 150 from the GRC distributed computing means 130. Thereafter, the data transmission is performed (step 500) for transmitting the command from the GRC data transmission interface 150 to the GEC data transmission interface 50, and then step 260 is performed to pass the command from the GEC data transmission interface 50 to the GEC distributed computing means 30. Thereafter, the GEC distributed computing means 30 sends the command to the at least one processor (not shown) of the controlled target for execution, so as to control and operate the controlled target, and the processor returns a response message (step 350), wherein the step 350 is performed through an interface (not shown), such as PCI or ISA bus. The GEC distributed computing means 30 sends the response message to the GEC data transmission interface 50 (step 360), and then the data transmission is performed (step 500) for returning the response message back to the GRC data transmission interface 150. Then, the GRC data transmission interface 150 passes the response message to the GRC distributed computing means 130 (step 370). Thereafter, the step 380 of displaying the response message is performed, wherein the response message is passed by the GRC distributed computing means 130, and displayed on the user interface 160.

Just as described above, the UID transmission (step 400) and the data transmission (step 500) can be two different sets of rules using the same transmission device, i.e. the GEC UID transmission interface 40 and the GEC data transmission interface 50 both can be the same one, which is one interface of the transmission device; and the GRC UID transmission interface 140 and the GRC data transmission interface 150 both can be the same one, which is the other interface of the transmission device.

It is worthy to be mentioned that the autonomous and universal remote control system and scheme of the present invention can be applied on the controlled targets of various fields, such as in the field of home appliance, the channel-selector of JavaTV fabricated by Java Media Frame (JMF); in the field of industrial automation, the application using Tiny VM and LEGO RCX robots; and in the field of finance, the RMI real-time stock exchange quotation system. After the GECs of the present invention are respectively installed on the RCX server, the stock quotation server and the JavaTV, when the GRC is moved to the front of the RCX server, the GRC will sense the UID of the RCX server via a UID transmission device, and download the context of the RCX server via data transmission; when the GRC is moved to the front of the stock quotation server, the GRC will sense the UID of the stock quotation server via the UID transmission device, and obtain the context of the stock quotation server via data transmission; and when the GRC is moved back home, the GRC also will sense the UID of the JavaTV via the UID transmission device, and obtain the context of the JavaTV via data transmission, so as to control the JavaTV. Therefore, when a GRC user interface enters a factory, a control interface of robots will be displayed on the GRC user interface; when entering a stock brokerage firm, a stock quotation interface will be displayed; and when coming back home, a channel-selector interface of JavaTV will be displayed.

Hence, the present invention can be applied to various fields, such as medical applications, factory automation and information appliances, etc. Moreover, the present invention can be fabricated by chip technologies, i.e. fabricating the elements, which can be made as hardware and has repetitive and complicated technologies, as a chip. According to the present invention, various GRCs can also be developed in accordance with different functions.

It is an advantage of the present invention to provide an autonomous and universal remote control system and a scheme thereof for automatically searching for controlled targets, and dynamically downloading the context in the controlled targets, whereby the use of one single remote controller can operate and control the controlled targets of various types without the need of manual setting, and is not constrained by the varieties and number of controlled targets.

It is the other advantage of the present invention to provide an autonomous and universal remote control system and a scheme thereof, wherein the present invention can automatically adjusting and generating appropriate user interfaces, whereby users can operate the controlled targets conveniently and efficiently.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. An autonomous and universal remote control scheme applied on an autonomous and universal remote control system comprising a GRC having a UID recognition means, a context collection means, a context translation means, a GRC distributed computing means, a GRC data transmission interface, a user interface and a GRC UID transmission interface; and at least one GEC that is respectively installed on at least one controlled target and matches with said GRC, said at least one GEC having a UID generating means, a GEC distributed computing element, a context generating means; a GEC data transmission interface; and a GEC UID transmission interface, wherein said at least one controlled target has installed at least one processor thereon, said at least one processor and said GEC distributed computing means communicating signals with each other, said autonomous and universal remote control scheme comprising:

said at least one GEC publishing a UID, wherein said UID is published by said UID generating means, and transmitted via an UID transmission which is executed via said GEC UID transmission interface and said GRC UID transmission interface;

said GRC obtaining and recognizing said UID, wherein said GRC obtains said UID via said UID transmission interface, and said UID is recognized by said UID recognition means;

triggering said context collection means;

sending a context-requesting instruction, wherein said context-requesting instruction is sent from said context collection means to said GRC distributed computing means;

sending said context-requesting instruction via said GRC distributed, computing means to said GRC data transmission interface;

performing a first data transmission to transmit said context-requesting instruction from said GRC data transmission interface to said GEC data transmission interface;

passing said context-requesting instruction to said GEC distributed computing means;

sending said context-requesting instruction via said GEC distributed computing means to said context generating means for generating a context;

sending said context to said GEC data transmission interface;

performing a second data transmission to transmit said context from said GEC data transmission interface to said GRC data transmission interface;

sending said context to said context collection means;

sending said context to said translation means for being interpreted and transformed into an information;

displaying said information, wherein said information is sent from said context translation means to said user interface for display;

generating and sending a command to said GRC distributed computing means, wherein said command is issued via said user interface;

sending said command to said GRC data transmission interface via said GRC distributed computing means;

performing a third data transmission to transmit said command from GRC data transmission interface to said GEC data transmission interface;

sending said command to said GEC distributed computing means;

sending said command to said at least one processor of said at least one controlled target for execution so as to control said at least one controlled target, wherein said at least one processor returns a response message;

sending said response message to said GEC data transmission interface via said GEC distributed computing means;

performing a fourth data transmission to transmit said response message from said GEC data transmission interface to said GRC data transmission interface;

sending said response message to said GRC distributed computing means; and displaying said response message, wherein said response message is sent from said GRC distributed computing means to said user interface for display.

2. The autonomous and universal remote control system of claim 1, wherein said UID generating means, said context generating means and said GEC distributed computing means are designed on an embedded operating system, and can be fabricated together with said GEC data transmission interface and said GEC UID transmission interface as a SIP or a SOC so as to be conveniently installed on said at least one controlled target or to be integrated with other SIPs.

3. The autonomous and universal remote control system of claim 2, wherein said SOC or said SIP can be formed as a device similar to a Set-Top box or a more powerful system chip, so as to be installed on said at least one controlled target.

4. The autonomous and universal remote control system of claim 1, wherein said UID recognition means, said context collection means, said context translation means and said GRC distributed computing means belong to a GRC kernel, and can be designed on an embedded operating system, and can be fabricated as a SIP or a SOC.

5. The autonomous and universal remote control system of claim 4, wherein said GRC UID transmission interface and said GRC data transmission interface can be formed on said SOC or said SIP.

6. The autonomous and universal remote control scheme of claim 1, wherein said UID is composed of said at least one controlled target's ID and network address.

7. The autonomous and universal remote control scheme of claim 1, wherein said context further comprises: a method of encoding and compressing data; and a digital signature.

8. The autonomous and universal remote control scheme of claim 1, wherein said user interface is a touch screen.

9. The autonomous and universal remote control system of claim 1, wherein said GEC UID transmission device and said GEC data transmission device can be the same one interface; and said GRC UID transmission interface and said GRC data transmission interface can be the same other one interface.

* * * * *